3,129,977
AUTOMATICALLY INDEXING WHEEL AND HUB
John B. Baldwin, South Pasadena, Calif., assignor to Schulz Tool and Manufacturing Co., San Gabriel, Calif., a corporation of California
Filed Mar. 14, 1962, Ser. No. 179,714
9 Claims. (Cl. 301—9)

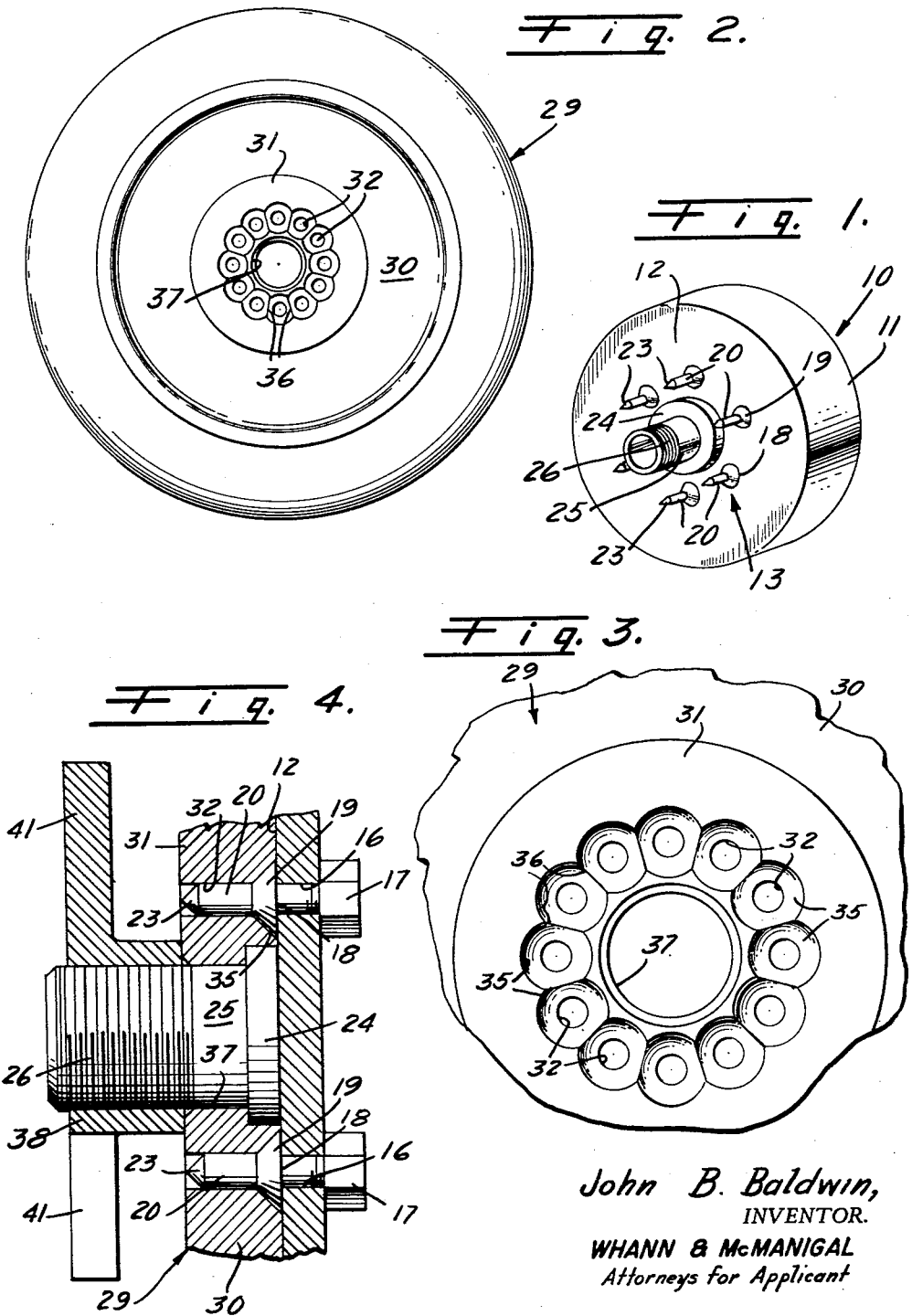

This invention relates to a wheel which has means to automatically index itself so that as it is moved onto a stud and axle of a hub, the studs are eased into the stud holes in the wheel with little or no resistance and, more particularly, relates to a racing car wheel and hub, the wheel being rapidly mountable on the hub without resistance from the studs.

The conventional hubs of a racing automobile have six studs protruding therefrom, circumferentially spaced radially outwardly from the axle onto which the wheel is secured. Racing car wheels must be changed during a long race and the time to accomplish these changes of wheels is of the essence. The time for changing wheels in the 500-Mile Indianapolis Race, with one man on each conventional wheel, is probably between 16 and 17 seconds. With the present invention, the wheels can be changed in approximately ten seconds.

It is an object of the present invention to provide an improved indexing means for rapidly mounting one member on protrusions of another member.

It is another object of the invention to provide an improved racing automobile wheel and hub.

It is still another object of the invention to provide a racing car wheel with a means to automatically index the stud holes in the wheel onto the studs as the wheel is being mounted on the hub.

It is a further object of the invention to provide a racing car wheel which, if it is held off center, as it is moved on the axle toward the studs in mounting it on the hub, the wheel is automatically aligned with the studs as it is moved toward them.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes only:

FIG. 1 is a perspective view of a hub of a racing car, having studs according to the invention;

FIG. 2 is an elevational view of the inner face of a racing car wheel according to the invention;

FIG. 3 is an enlarged fragmentary view of the wheel shown in FIG. 2; and

FIG. 4 is an enlarged fragmentary cross sectional view of the wheel shown in FIG. 2 mounted on the hub.

Referring again to the drawings, there is shown in FIG. 1 a rotatable racing car hub 10, having an enlarged diameter portion 11. Outwardly extending from front face 12 of the hub are circumferentially spaced studs 13. The studs extend through cylindrical bores 16 in the hub, as shown in FIG. 4, and are secured thereto by means of nuts 17 on their inner threaded ends and flanges 18 in abutment with the hub face 12. The flanges have a beveled face 19 with the largest diameter portion against the hub and the smallest diameter extending outwardly therefrom and terminating on outer cylindrical portions 20 of the studs. Extending from the portions 20 are outer ends 23 of the studs which have a sharp conical configuration.

The studs have their centers on the circumference of a circle whose center is at the center of the hub. From the center of the hub, radially inwardly from the studs, extends a cylindrical boss 24 and from which extends, axially outwardly therefrom, a wheel axle 25 having threads 26 on its outer end. The axes of the studs and axle are parallel.

As may be seen in FIGS. 2, 3 and 4, a racing car wheel 29 has an outer disc portion 30 and a laterally thickened inner disc portion 31 to add supporting structure around circumferentially spaced stud holes 32, of which there are twelve, in contrast to the conventional six. The holes may be a multiple of the numbers of studs. On the inner face of the wheel, adapted to abut with the outer face 12 of the hub, each of the stud holes 32 has a beveled countersink 35 complementary to the beveled flanges 19 on the studs. Each of the countersinks 35 overlap the countersink on each side of it, circumferentially, so as to form chords 36. The stud holes are centered on the circumference of a circle having a diameter equal to that on which the studs 13 are centered, the center of the former being at the center of the wheel. As there are twice as many stud holes 32 as there are studs 13, the arcs between the centers of the stud holes are just half the length of the arcs between the centers of the studs, the studs being adapted to fit in one set of six alternate stud holes 32 or a second set of stud holes spaced alternately between the first set.

At the center of the wheel 29 is an axle bore 37 adapted to slide on the axle 25 so that the inner face of the wheel around the hole 37 is adapted to abut the outer face of the boss 24. The axes of the bore 37 and of the stud holes 32 are parallel.

As may be seen in FIG. 4, when the wheel is on the hub, the studs 13 being in six alternate holes 32, the beveled faces 18 being on corresponding countersinks 35, and the axle 25 extending into the axle bore 37, the wheel is secured on the hub by means of a winged-knockoff nut 38. This nut is rapidly threadedly engaged, and disengaged, on threads 36 by means of hammer blows on wings 41.

In the operation of putting the wheel on the hub, since the stud holes are circumferentially arranged correspondingly to the studs 13, when the wheel is moved rapidly onto the hub, the bore hole 37 sliding over the axle 25, if the studs do not go directly into the holes 32, each of the six alternate countersinks 35 make contact with the points on the outer ends 23 of the studs. The countersinks then act as guides to locate the studs automatically relative to six alternate stud holes 32.

To prevent the studs from making contact with flat surfaces on the wheel, the length of the chords 36, or extent of overlap of the countersinks, and their size, must be determined by the clearance between the axle bore 37 and the axle 25. That is, the overlap between the countersinks and the length of the chords must be such that the beveled surfaces of the countersinks are presented to the stud points even when the wheel is off center its greatest amount relative to the hub. By this arrangement, if the wheel is off center relative to the hub to the extent of the clearance between the axle and the axle bore, or less, the countersinks automatically align the wheel correctly as they contact the studs.

By having the points 23 relatively sharp and the countersink surface relatively steep, the wheel moves onto the hub in the centered position at a rapid rate and there is no delay as in the conventional wheel and hub in which the studs are presented with a flat surface rather than a beveled countersink.

The invention and its attendant advantages will be understood from the foregoing description and it will be apparent that various changes may be made in the form, construction and arrangement of the parts of the invention without departing from the spirit and scope thereof or sacrificing its material advantages, the embodiment hereinbefore described being merely for the purpose of illustration.

I claim:
1. A wheel for mounting on a hub,
   (a) said wheel having a central portion;
   (b) an opening in said central portion for fitting on an axle extending from a hub;
   (c) holes through said central portion for fitting on studs extending from said hub, said holes being circumferentially spaced around said opening;
   (d) and guide means circumferentially arranged on said central portion around said opening and adjacent said holes for automatically registering said holes with said studs if said central portion makes contact with said studs when said wheel is slipped onto said axles and said central portion has been moved axially for the purpose of fitting said holes onto said studs.

2. A wheel for mounting on a hub,
   (a) said wheel having a central portion;
   (b) an opening in said central portion for fitting on an axle extending from a hub;
   (c) holes having axes parallel to said opening through said central portion for fitting on studs extending from said hub, said holes being circumferentially spaced around said opening;
   (d) and guide means surrounding said holes for registering said holes with said studs when said wheel is slipped onto said axle and said central portion is moved to make contact with said studs if said studs are not in said holes,
   (e) said guide means surrounding each hole overlapping the guide means of the holes spaced next to it.

3. A wheel for mounting on a hub,
   (a) said wheel having a central portion;
   (b) an opening in said central portion for fitting on an axle extending from a hub;
   (c) holes having axes parallel to said opening through said central portion for fitting on studs extending from said hub, said holes being circumferentially spaced around said opening;
   (d) and each of said holes having tapered countersinks, each countersink overlapping the countersinks of the holes next thereto.

4. A wheel for mounting on a hub,
   (a) said wheel having a central portion;
   (b) an opening in said central portion for fitting on an axle extending from a hub;
   (c) holes having axes parallel to said opening through said central portion for fitting on pointed studs extending from said hub, said holes being circumferentially spaced around said opening;
   (d) each of said holes having tapered countersinks, each countersink overlapping the countersinks of the holes next thereto;
   (e) and tapered flanges on said studs based on said hub and being complementary to said countersinks on said holes so that said flanges mate with said countersinks when said wheel is on said hub.

5. A vehicle wheel for mounting on a vehicle hub, said wheel comprising:
   (a) a central portion and a peripheral portion, said portions being securely joined;
   (b) an axle extending from said hub;
   (c) an opening in said central portion for fitting on said axle;
   (d) circumferentially spaced holes having axes parallel to the axis of said opening and extending through said central portion radially outwardly of said opening for fitting on studs extending from said hub around said axle;
   (e) each of said holes having tapered countersinks facing said hub, each countersink overlapping the countersinks of the holes next thereto;
   (f) and tapered flanges on said studs based on said hub and being complementary to said countersinks on said holes so that said flanges mate with said countersinks when said wheel is on said hub.

6. A first main member for mounting on a second main member, said first main member comprising:
   (a) a mounting portion on said first main member;
   (b) a first mounting member extending from said second main member;
   (c) an opening in said mounting portion for fitting on said first mounting member;
   (d) circumferentially spaced holes having axes parallel to the axis of said opening and extending through said mounting portion outwardly of said opening;
   (e) second mounting members extending from said second main member and being spaced circumferentially around said first mounting member in positions corresponding to said holes relative to said opening;
   (f) each of said holes having tapered countersinks facing said second main member, each countersink overlapping the countersinks of the holes next thereto;
   (g) and tapered flanges on said second mounting members based on said second main member and being complementary to said countersinks on said holes so that said flanges mate with said countersinks when said first main member is on said second main member.

7. A demountable wheel and a hub comprising:
   (a) a central portion on said wheel removably securable to said hub;
   (b) an axle extending from said hub;
   (c) an opening in said central portion for fitting on said axle;
   (d) circumferentially spaced holes extending through said central portion radially outwardly of said opening;
   (e) circumferentially spaced studs extending from said hub radially outwardly of said axle;
   (f) said studs being positioned relative to said holes so that said studs extend through respective holes when said opening is fitted on said axle and said wheel is in position to be secured to said hub;
   (g) each of said holes having tapered countersinks facing said hub, each countersink overlapping the countersinks of the holes next thereto; and
   (h) tapered flanges on said studs based on said hub and being complementary to said countersinks on said holes so that said flanges mate with respective countersinks when said wheel is secured to said hub.

8. The invention according to claim 7, in which:
   (a) there are more holes than studs.

9. In combination, a wheel and hub comprising:
   (a) a central portion on said wheel removably securable to said hub;
   (b) an axle extending from said hub;
   (c) an opening in said central portion for fitting on said axle;
   (d) circumferentially spaced holes having axes parallel to the axis of said opening and extending through said control portion radially outwardly of said opening;
   (e) parallel circumferentially spaced studs extending from said hub radially outwardly of said axle,
   (f) all of said studs being aligned with respective holes when one of said studs is aligned with one of said holes and said opening is fitted on said axle, the number of holes being a multiple of the number of studs;
   (g) each of said holes having tapered countersinks facing said hub, each countersink overlapping the countersinks of the holes next thereto;
   (h) tapered flanges on said studs based on said hub and being complementary to countersinks on said holes so that said flanges mate with respective countersinks when said wheel is secured to said hub; and (i) means securable on the outer end of said axle outwardly of said wheel on said hub for securing said wheel to said hub.

References Cited in the file of this patent

UNITED STATES PATENTS

| | | |
|---|---|---|
| 1,666,722 | Tarbox | Apr. 17, 1928 |
| 2,107,925 | Ash | Feb. 8, 1938 |
| 2,684,140 | Warn | July 20, 1954 |